W. M. JOHNSTON.
CAMERA.
APPLICATION FILED APR. 1, 1915.

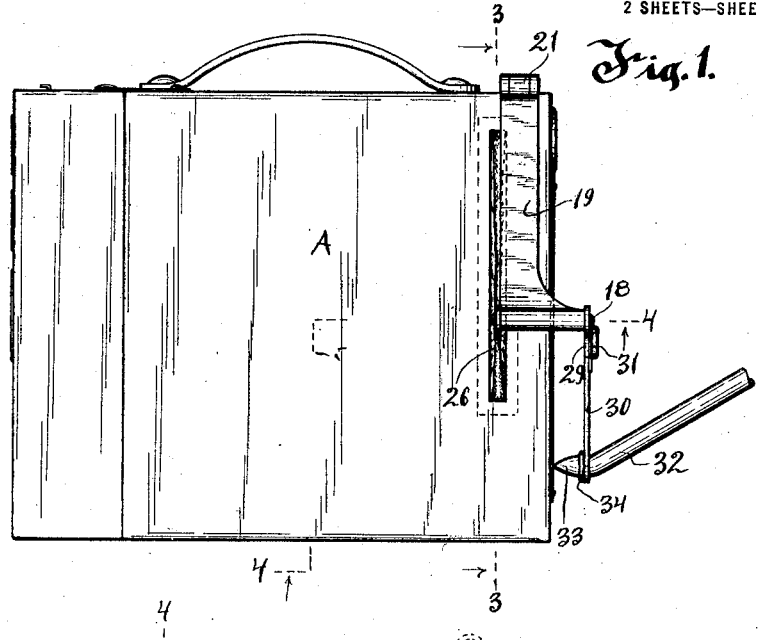
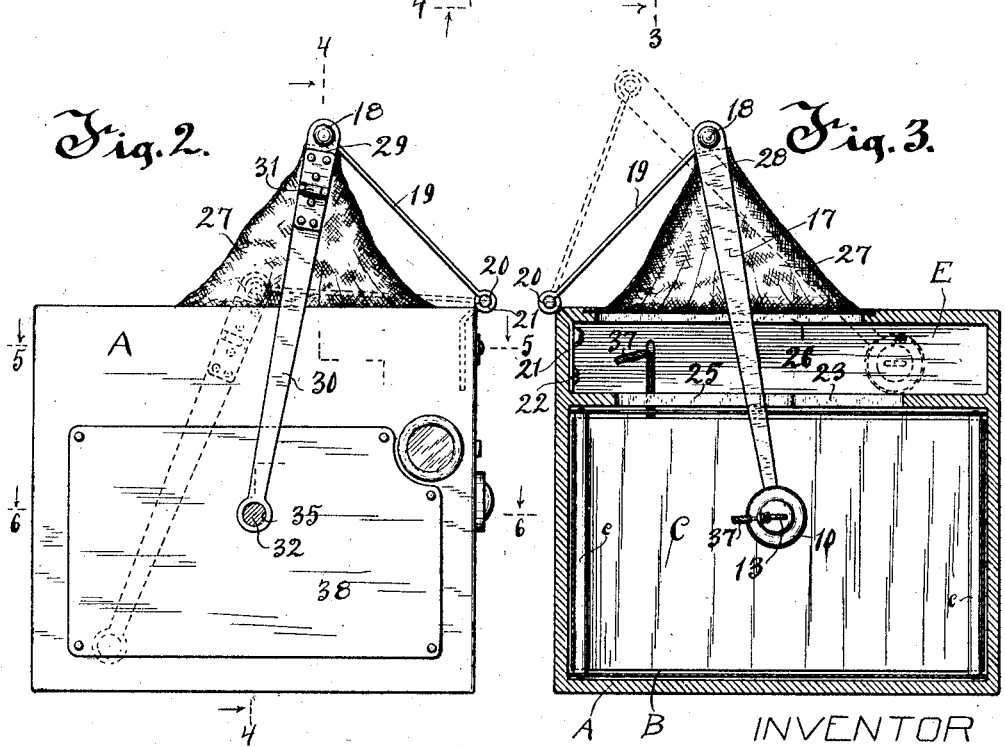

1,321,102.

Patented Nov. 11, 1919.
2 SHEETS—SHEET 2.

INVENTOR
Winfred M. Johnston

Morsell, Keeney & French.
ATTORNEYS.

UNITED STATES PATENT OFFICE.

WINFRED M. JOHNSTON, OF DALE, WISCONSIN.

CAMERA.

1,321,102.    Specification of Letters Patent.    Patented Nov. 11, 1919.

Application filed April 1, 1915. Serial No. 18,541.

*To all whom it may concern:*

Be it known that I, WINFRED M. JOHNSTON, a citizen of the United States, and resident of Dale, in the county of Outagamie and State of Wisconsin, have invented new and useful Improvements in Cameras, of which the following is a description, reference being had to the accompanying drawings, which are a part of this specification.

The invention relates to cameras.

The invention designs to provide in combination with a camera using either an ordinary film or plate, a means for writing directly upon the sensitized side of said film or plate.

By its use in connection with a camera the device may be used to write autographs or anything desired upon a reproduction taken by the camera. I am aware that heretofore the writing on a film has been produced by using a special kind of film backing and a pencil which writes on said back, but my device differs from this in that it may be employed in connection with the usual film or plate.

The invention further designs to provide in combination with a camera, a means for writing inside of the camera upon the film or plate disposed therein which means consists of an artificial light, the travel and operation of which is controlled by a guiding and control means operated from the outside of the box.

The invention, while particularly adapted for use in connection with a camera, may be used in connection with any light proof box carrying sensitized material which may be written or drawn upon by the artificial light or light pencil within the box and in this instance could be used to reproduce writings and drawings upon a film or plate.

The invention further consists in the several features hereinafter set forth and more particularly defined by claims at the conclusion hereof.

In the drawings, Figure 1 is a side elevation of the device embodying the invention;

Fig. 2 is an end elevation thereof;

Fig. 3 is a section taken on line 3—3 of Fig. 1.

Figure 4:
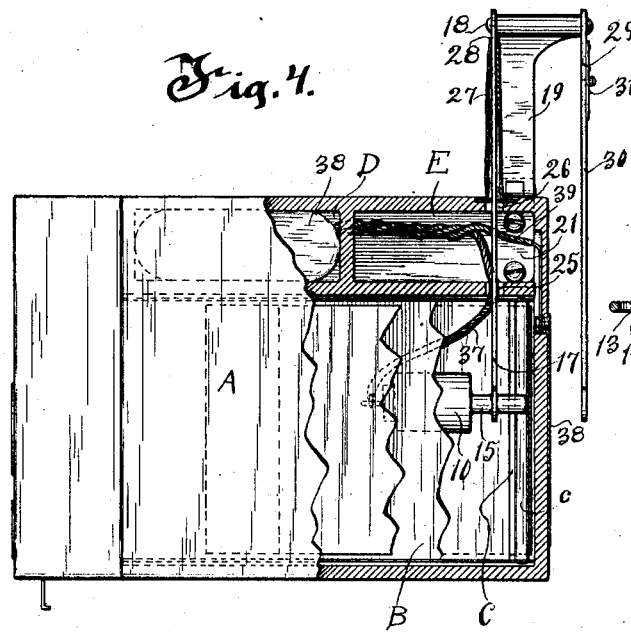
Fig. 4 is a section taken on line 4—4 of Fig. 1, parts being broken away.
Figure 7:
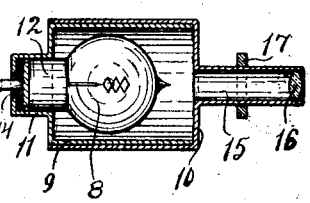
Fig. 7 is a detail sectional view of the light.

The invention is shown applied to a camera A of usual construction having a light proof interior B and sensitized material, such as the ordinary film C, disposed therein on guide rolls $c$ and compartments D and E mounted on one side of the camera.

The invention consists in a means for writing or drawing directly upon the sensitized material, and means for guiding and controlling the operation of said writing or drawing means.

The writing or drawing means comprises an electric light, such as the incandescent lamp 8, mounted in a casing comprising telescoping casing members 9 and 10. The member 9 is provided with a pocket 11 for receiving the lamp 8, the sleeve contact of said lamp being connected to the casing and the tip contact 13 of said lamp being insulated therefrom by insulation 14. The member 10 fits over the member 9 and is provided on its front end with an apertured extension or hollow cylindrical tube 15 whose longitudinal axis is coincident with that of the lamp and a lens 16 is disposed within said tube 15 adjacent the end thereof to throw the axis of light passing from the lamp 8 down the tube 15 out in a straight path, forming what may be termed a "light pencil".

Means are provided for disposing the light within the camera so that the light rays will act directly upon the sensitized material in the camera and consists of a link or rod 17 to which the casing member 10 is secured, said link being pivotally secured by a pin 18 to another link 19 which in turn is pivotally secured by a pin 20 to a bracket 21 secured within the inside of the camera by any suitable means, such as screws 22.

Figure 5:
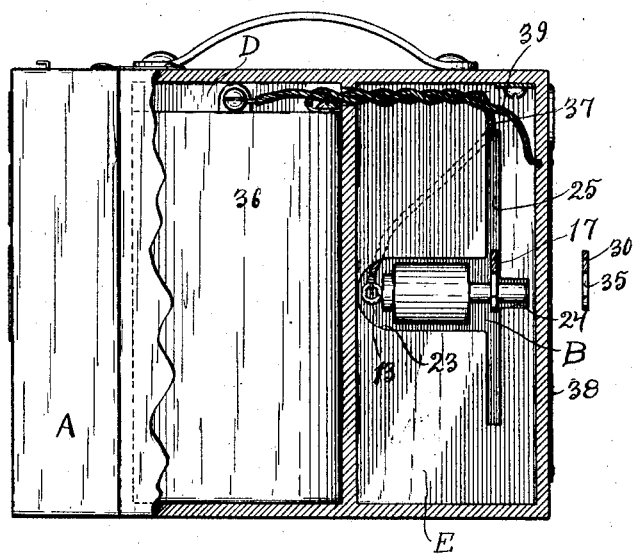
Fig. 5 is a section taken on line 5—5 of Fig. 2.
Figure 6:
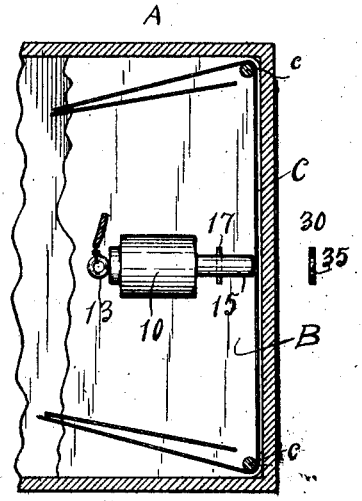
Fig. 6 is a section taken on line 6—6 of Fig. 2.

Means are also provided for permitting the insertion and withdrawal of the light from the camera comprising horizontally extending slots 23 and 24 and a vertical slot 25 communicating with the said slots 23 and 24 as shown in Fig. 5, so that the light may be withdrawn from the camera and brought into the compartment E which is provided with a vertically extending slot 26 disposed in the same plane as the slot 25 so that the link 17 may pass through both of said vertical slots and light is prevented from entrance through these slots by a light proof sleeve 27 secured adjacent the sides of the slot 26 and extending upwardly and fastened to the upper end 28 of the link 17.

Thus the links 17 and 19, the slots 23, 24, 25 and 26 form means for disposing the writing means in the casing and for permitting its withdrawal into the compartment E.

The means for guiding the light comprises means for guiding the links 17 and 19 and this consists of a two part link comprising a portion 29 secured to the pin 18 so that it and the link 17 will move together and be substantially parallel to each other and a portion 30 which forms a continuation of the portion 29 and is connected thereto by a hinge 31. This construction forms a four arm pivotal link means for transmitting the motions of the operating pencil to the light pencil. Means are also provided for guiding two part link consisting of an electrical conductor member 32 resembling a pencil having a pointed end 33 disposed at any suitable angle to its handle portion for use in writing and provided with a collar 34 adjacent the said pointed end the pencil being slidably and rotatably movable within an aperture 35 in the two part link and more particularly in the portion 30 thereof, the collar 34 forming a bearing for the apertured end of the member 30. With the linkage above described the operator, by guiding the pencil 32, will through the two part link, pin 18 and link 19 guide the link 18 so that it will move in parallel relation to the two part link and for every movement of said two part link there will be a corresponding movement of said link 18. The aperture 35 in the link member 30 is coaxial with the aperture formed by the tube 15 so that for every movement of the pencil 32 the tube 15 will move in parallel relation therewith and guide the beam of light issuing from the tube upon the face of the film C and thus trace out the movement of the pencil point 33 upon the ordinary film and on the side thereof which is sensitized.

The means for controlling the operation of the writing means comprises means for controlling the operation of the lamp 8. The lamp 8 receives its power from a battery 36 in compartment D being connected by one of its poles to a conductor 37 connected to the tip contact 13 of said lamp. The circuit is completed through the sleeve contact 12 of the lamp by a conductor plate 38 mounted on the outside of the back end of the camera and connected to the other pole of the battery through a conductor 39 the circuit being sleeve contact 12, lamp casing, link 17, pin 18, two part link 29 and 30, pencil 32, plate 38 conductor 39 to the battery. Thus whenever the pencil 32 is in contact with the plate 38 the circuit through the lamp will be completed and the "light pencil" will be operative. If it is desired to shut off the light, the two part link will, through the hinge 31, permit the operator to raise the pencil 32 away from the plate 38 thus breaking the circuit.

The operation of the device is as follows:—

If the lamp 8 has been drawn out and is in the compartment E, the operator by manipulating the link 19 brings the light 8 and the link 17 through the slots in the partition between the interior B of the camera and the compartment E. This brings the light adjacent the sensitized material. With the pencil 32 inserted in the aperture 35 in the link 30 so that it rests upon the collar 34 the operator may now bring the pencil point 33 down into contact with the plate 38. This establishes the circuit through the lamp as previously described, the rays of light striking the sensitized material will through the linkage previously described, form a tracing pencil under control of the pencil 32 which is operated on the outside of the camera by the operator so that the light will reproduce upon the sensitized material that which is written or drawn by the pencil 32. When the sensitized film or plate is developed the writing or drawing executed thereon by the light pencil will be displayed on said film or plate.

Thus, with the construction above set forth, the operator, by means on the outside of the camera, may guide the point of light or tracing point within the camera in its course over the sensitized material to expose the portions thereof against which it acts and may, at any time, break the circuit through the tracing point and remove it from the inside of the camera.

It will be noted that while the invention is shown applied to a camera it might be applied to a light proof box for reproducing upon sensitized material a copy of an original writing or drawing on the outside of the box.

What I claim as my invention is:

1. The combination, with a light proof box adapted to have a piece of sensitized material disposed therein, of a movable light pencil within the box for writing directly upon the sensitized side of the material, and a four arm pivotal link means for controlling the operation of said light pencil.

2. The combination, with a light proof box adapted to have a piece of sensitized material disposed therein, of a movable light pencil within the box for writing directly upon the sensitized side of the material, and a pivotal link means for controlling the operation of said light pencil comprising four links, of which the first is hinged to an outer portion of said box, the second and third are rigidly connected together by a pivot connecting them to the first, and the fourth is pivotally connected to the third to swing toward and from the second, said first, third and fourth links being outside said box and the second extending through a light proof closure into said box.

3. The combination, with a light proof box adapted to have an elongated opening and provided with sensitized material, a movable light pencil within the box for writing directly upon the sensitized side of the sensitized material, a four arm pivotal link means for controlling the operation of said light pencil, and a light proof flexible means covering said elongated opening in the box and connected to the outermost pivotal connection of the link means to prevent the light rays from entering the box through the elongated opening and also permitting the free movement of the link means.

4. The combination, with a light proof box adapted to have a piece of sensitized material disposed therein, of a movable light pencil within the box, a movable operating pencil outside of the box, and a four arm pivotal link means for transmitting the motions of the operating pencil to the light pencil, the part of the link means carrying the operating pencil being adapted to fold over in a position parallel with the top of said box.

In testimony whereof, I affix my signature.

WINFRED M. JOHNSTON.

Copies of this patent may be obtained for five cents each, by addressing the "Commissioner of Patents, Washington, D. C."